(12) United States Patent
Schultz et al.

(10) Patent No.: US 8,596,803 B2
(45) Date of Patent: Dec. 3, 2013

(54) SYSTEM FOR ILLUMINATING A VEHICLE INTERIOR TRIM COMPONENT

(75) Inventors: Steve G. Schultz, Holland, MI (US); Brook Rodney Burg, Grand Rapids, MI (US); Timothy J. Borgeson, Hudsonville, MI (US); Jonathan M. Frens, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 219 days.

(21) Appl. No.: 13/012,556

(22) Filed: Jan. 24, 2011

(65) Prior Publication Data
US 2012/0188779 A1 Jul. 26, 2012

(51) Int. Cl.
*G01D 11/28* (2006.01)
(52) U.S. Cl.
USPC .............................. 362/26; 362/489; 362/551
(58) Field of Classification Search
USPC ........... 362/26, 27, 28, 29, 30, 248, 488, 489, 362/561, 602
See application file for complete search history.

(56) References Cited

U.S. PATENT DOCUMENTS

| 2,566,026 | A | * | 8/1951 | Hughes, Jr. | 362/26 |
| 7,647,881 | B2 | * | 1/2010 | Kraus | 362/489 |
| 8,016,442 | B2 | * | 9/2011 | Kato | 362/30 |
| 2005/0078925 | A1 | | 4/2005 | Shi | |
| 2006/0285354 | A1 | * | 12/2006 | Birman et al. | 362/602 |
| 2007/0025096 | A1 | * | 2/2007 | Snider et al. | 362/29 |
| 2009/0073708 | A1 | | 3/2009 | Kino et al. | |
| 2009/0135580 | A1 | * | 5/2009 | Suess et al. | 362/26 |

FOREIGN PATENT DOCUMENTS

| DE | 102008060354 | 6/2010 |
| EP | 1767402 | 3/2007 |
| EP | 2218610 | 8/2010 |
| WO | 2007022202 | 2/2007 |

OTHER PUBLICATIONS

PCT International Search Report mailed Jun. 1, 2012.
International Preliminary Report on Patentability dated Aug. 8, 2013.

* cited by examiner

*Primary Examiner* — Y My Quach Lee
(74) *Attorney, Agent, or Firm* — Fletcher Yoder, P.C.

(57) ABSTRACT

A vehicle interior assembly includes a light guide and a light source configured to illuminate the light guide. The vehicle interior assembly also includes an interior trim component at least partially disposed about a display. The interior trim component includes a light transmissive material configured to receive light from the light guide, and to emit light into a vehicle interior.

20 Claims, 6 Drawing Sheets

SYSTEM FOR ILLUMINATING A VEHICLE INTERIOR TRIM COMPONENT

BACKGROUND

The invention relates generally to trim components within a vehicle interior, and more specifically, to a system for illuminating a vehicle interior trim component.

A variety of decorative interior trim components may be employed throughout an interior of a vehicle. For example, certain instrument panels (e.g., instrument gauge cluster modules, driver information electronic sub-assemblies, etc.) may include decorative rings disposed about individual gauges, groups of gauges and/or the perimeter of the instrument panel. Other instrument panels may include a graphical display having a decorative trim component disposed about the border of the display. Furthermore, additional displays and/or gauges may be located within other areas of the vehicle interior, such as the center console and/or the headrest of a seat, for example. Such displays and/or gauges may also include a decorative trim component disposed about their perimeters.

Certain decorative trim components are used in coordination with various gauges or displays, such as a thin film transistor (TFT) display. For example, decorative trim components may be used to provide backlit graphics above and about a display area. In certain configurations, backlit graphics on an interior trim component may be used to display the numbers on a speedometer gauge, where the interior trim component is positioned about the electromechanical or digital speedometer needle. Unfortunately, such illuminated interior trim components may partially obstruct a view of adjacent displays or graphics. For example, certain illuminated interior trim components may extend 25 mm or more above a surface of the display due to the size of the light emitting components positioned behind the trim component. As a result, when the display is viewed at an angle, a portion of the display adjacent to the illuminated interior trim component may be blocked.

In addition, because displays such as TFT displays are generally very bright, it may be desirable for the backlit graphics to be equally as bright to match the luminous intensity of the display. Consequently, using the display itself as a light source may be undesirable because the display may lack the brightness required to sufficiently illuminate the graphics of the interior trim component. Furthermore, using the display as the light source for illuminating the interior trim component may result in uneven light distribution due to potential light blockage when the graphics assembly is disposed over and/or about the display. Accordingly, there is a need for a low profile illuminated interior trim component that provides sufficient light intensity for use with digital displays.

BRIEF DESCRIPTION OF THE INVENTION

The present invention relates to a vehicle interior assembly including a light guide, a light source that illuminates the light guide, and an interior trim component positioned adjacent to a display where the light source is not positioned between the light guide and the display. The interior trim component is light transmissive and configured to receive light from the light guide and to emit the light into a vehicle interior.

The present invention also relates to a vehicle interior assembly including a display and a light transmissive interior trim component having a first side and a second side, where the first side faces the display. The vehicle interior assembly further includes a light guide disposed adjacent to the first side of the light transmissive interior trim component and a light source configured to illuminate the light guide where the light source is not positioned between the light guide and the display. Furthermore, the light transmissive interior trim component is configured to receive light from the light guide and to emit the light from the second side of the light transmissive interior trim component.

The present invention further relates to a method for manufacturing a vehicle interior assembly. The method includes disposing a light source adjacent to a light guide such that the light emitted from the light source is directed toward the light guide. The method further includes disposing the light guide adjacent to a light transmissive interior trim component such that the light emitted from the light guide is directed toward the light transmissive interior trim component, and disposing the light transmissive interior trim component at least partially about a display, where the light source is not positioned between the light guide and the display.

DETAILED DESCRIPTION

Figure 1:
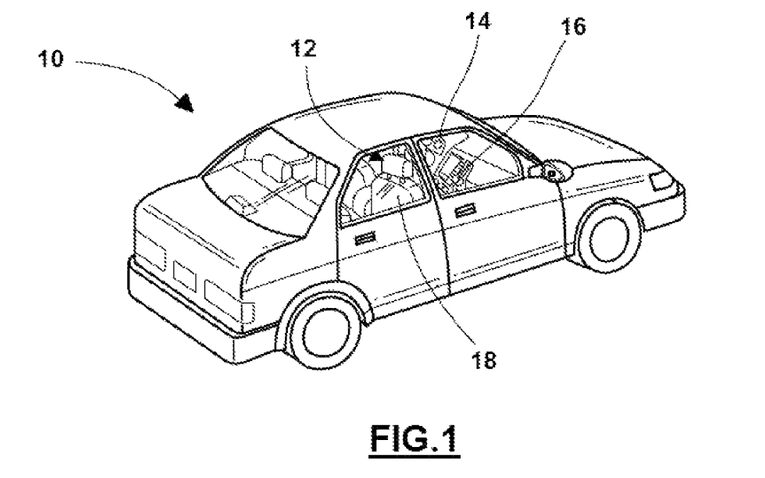
FIG. 1 is a perspective view of an exemplary vehicle that may include a system for illuminating a vehicle interior trim component.

FIG. 1 is a perspective view of an exemplary vehicle 10 that includes a system for illuminating a vehicle interior trim component. As illustrated, the vehicle 10 includes an interior 12 having a vehicle interior assembly, such as illustrated instrument panel 14 (e.g., instrument gauge cluster module, driver information electronic sub-assembly, etc.), a front console 16 and seats 18. A variety of interior trim components may be employed throughout the vehicle interior 12. For example, the instrument panel 14 may include decorative rings disposed about individual gauges, groups of gauges and/or the perimeter of the instrument panel 14. Other instrument panels 14 may include a graphical display having an interior trim component disposed about the border of the display. Furthermore, additional displays and/or gauges may be located within other areas of the vehicle interior, such as the front console 16 and/or the headrest of the seat 18, for example. Such displays and/or gauges may also include an interior trim component disposed about their perimeters.

As discussed in further detail below, at least one interior trim component within the vehicle interior 12 is illuminated to provide accent lighting or backlit graphics. For example, an interior trim component may be disposed about a graphical display within the instrument panel 14. An exemplary interior trim component may be constructed from a light transmissive material. The interior trim component may use diffused lighting in a low profile configuration to illuminate graphics at least partially around the perimeter of the graphical display. As a result, the interior trim component will appear integrated and flush with the graphical display and the instrument panel 14.

Figure 2:
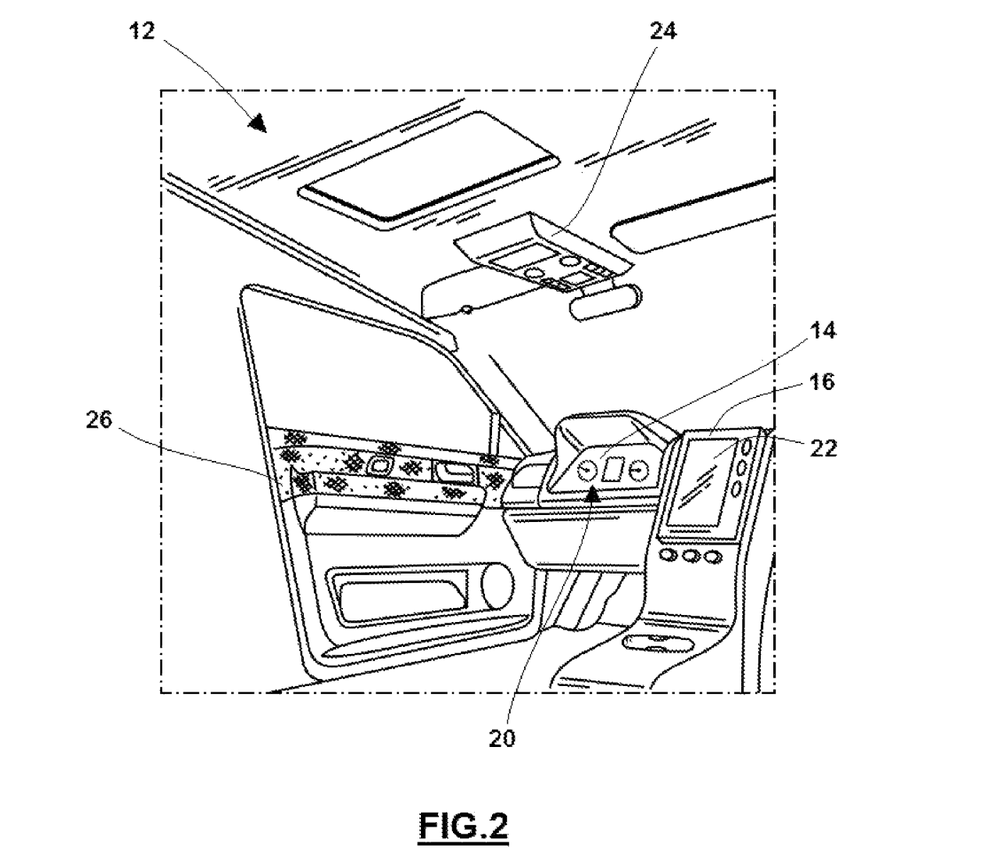
FIG. 2 is a perspective view of a part of an interior of the vehicle of FIG. 1.

FIG. 2 is a perspective view of a part of the interior 12 of the vehicle 10 of FIG. 1. As illustrated, the instrument panel 14 includes a cluster of electronic sub-assemblies 20. As discussed in detail below, the electronic sub-assemblies 20 may include electromechanical gauges and/or graphical displays, for example. Each sub-assembly within the instrument panel 14 may include an interior trim component disposed about the perimeter. In addition, an interior trim component may be disposed about a group of sub-assemblies and/or about the perimeter of the instrument panel 14. At least one interior trim component within the instrument panel 14 may provide backlit graphics using a low profile configuration. In the illustrated embodiment, the front console 16 includes another electronic display 22 which may include an interior trim component disposed about the perimeter of the display 22. Furthermore, an overhead console 24 and/or a door panel 26 may include electronic displays having interior trim components. One or more of these interior trim components may provide backlit graphics or accent lighting using a low profile configuration.

Figure 3:
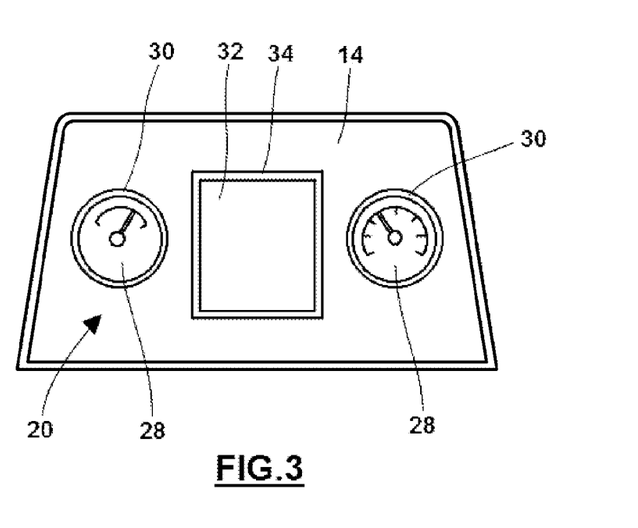
FIG. 3 is a front view of an exemplary instrument panel including multiple interior trim components.

FIG. 3 is a front view of an exemplary instrument panel 14 including multiple interior trim components. In the illustrated embodiment, the instrument panel 14 includes a cluster of electronic sub-assemblies 20, such as the illustrated electromechanical gauges 28. The electromechanical gauges 28 are configured to receive a signal indicative of a value of a vehicle parameter, and to convey the value to a vehicle operator. For example, the electromechanical gauges 28 may be configured to display a value indicative of fuel quantity, vehicle speed, coolant temperature, oil temperature, oil pressure, crankshaft rotation rate and/or other parameters associated with operation of the vehicle 10. As illustrated, an interior trim component 30 is disposed about each electromechanical gauge 28. As mentioned above, the interior trim component 30 may be constructed from a light transmissive material.

In addition, the cluster of electronic sub-assemblies 20 includes a graphical display 32. In certain embodiments, the graphical display 32 includes a liquid crystal display (LCD), e.g., thin film transistor (TFT) display, configured to present various vehicle parameters and/or navigational information to a vehicle operator. For example, the graphical display 32 may be configured to display numerical and/or graphical representations of values indicative of fuel quantity, vehicle speed, coolant temperature, oil temperature, oil pressure, crankshaft rotation rate and/or other parameters associated with operation of the vehicle 10. In addition, the graphical display 32 may be configured to present two-dimensional or three-dimensional information associated with operation of the vehicle entertainment system, environmental control system, and/or navigational system (e.g., a moving map display). Similar to the electromechanical gauges 28, an interior trim component 34 is disposed about the graphical display 32. As discussed in detail below, the interior trim components 30 and 34 may use diffused lighting to provide backlit graphics or accent lighting about the gauges 28 and the graphical display 32. Furthermore, the interior trim components 30 and 34 may be constructed using a low profile configuration to provide a flush and integrated appearance. While an instrument panel 14 is described above, it should be appreciated that an interior trim component using diffused lighting and having a low profile configuration may be employed within alternative vehicle interior assemblies, such as front consoles 16, seats 18 and/or door panels 26, for example.

Figure 4:
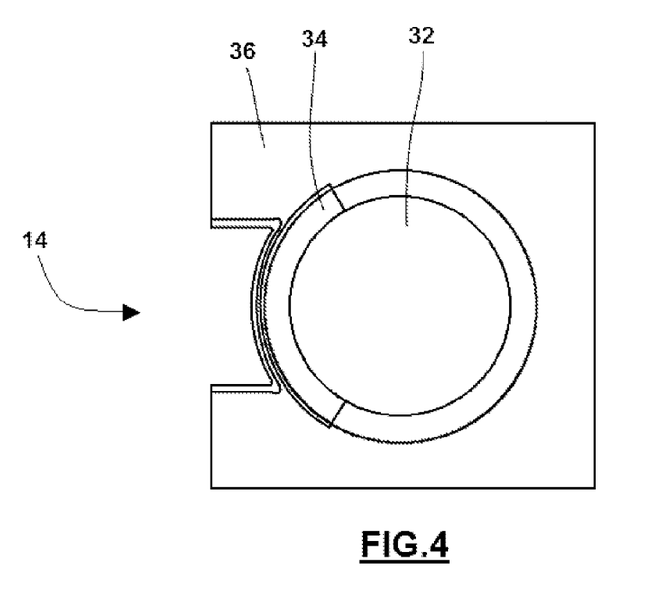
FIG. 4 is front view of an embodiment of a vehicle interior assembly including a gauge, a housing and an interior trim component configured to provide backlit graphics about the gauge.

FIG. 4 is a front view of an embodiment of a vehicle interior assembly including an interior trim component 34 configured to provide backlit graphics or accent lighting about a display 32. The vehicle interior assembly also includes a housing 36 at least partially disposed about a perimeter of the trim component 34. The housing 36 may be constructed from a solid piece of material (e.g., metal, plastic, etc.). In certain embodiments, the interior trim component 34 may display graphics associated with the information conveyed by the display 32. For example, the display may include a graphical representation of a speedometer needle pointing toward the interior trim component 34. In such a configuration, the interior trim component 34 may display incremental values of vehicle speed. In the illustrated embodiment, the housing 36 and interior trim component 34 are positioned on top of the display 32. Because the interior trim component 34 employs a low-profile lighting system, the interior trim component will not block an angled view of the display 32, thereby providing the appearance that the display 32 and the interior trim component are an integrated unit. In alternative embodiments, the vehicle interior assembly may be disposed about an electromechanical gauge 28.

Figure 5:
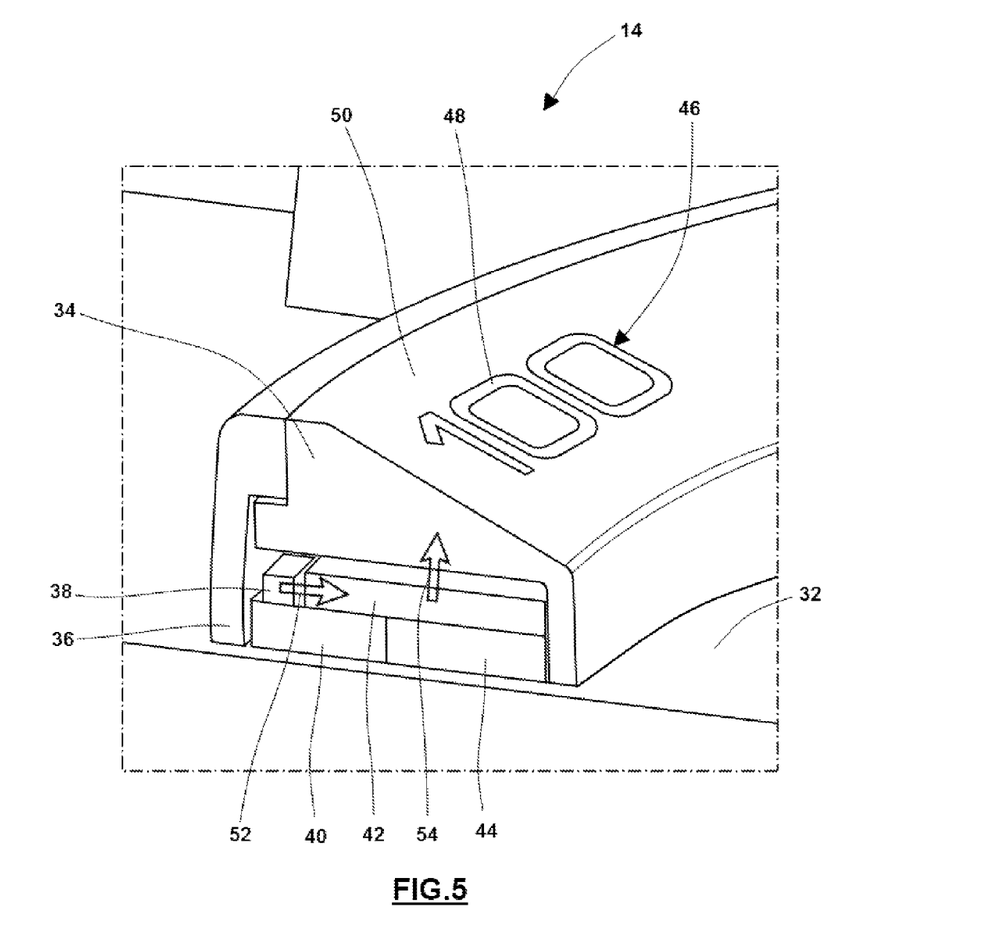
FIG. 5 is a cross-sectional perspective view of the vehicle interior assembly of FIG. 4, including a light guide, a light source and a light transmissive interior trim component.

FIG. 5 is a cross-sectional perspective view of the vehicle interior assembly shown in FIG. 4. More particularly, the interior assembly is configured to illuminate a graphic 46. As illustrated, the vehicle interior assembly includes a light source 38 disposed on a circuit assembly 40. The light source 38 is electrically coupled to the circuit assembly 40, and the circuit assembly 40 is configured to drive the light source 38. In the illustrated embodiment, the light source 38 is a light emitting diode (LED). However, it should be appreciated that other light sources (e.g., fluorescent, incandescent, etc.) may be employed in alternative embodiments. Further, the light source 38 may be any of a variety of colors, and, as discussed in additional detail below, the vehicle interior assembly may include any number of light sources 38. In certain embodiments, the circuit assembly 40 may be a printed circuit board, while in other embodiments the circuit assembly 40 may be a flex circuit.

In the illustrated embodiment, the light source 38 is configured to emit light in a direction 52. As a result, the light emitted by the light source 38 is received by a light guide 42 positioned adjacent to the light source 38. While the illustrated light source 38 is a "side-firing" LED configured to emit light from a side of the light source 38, it should be appreciated that alternative embodiments may employ other light sources having a light emitting surface directed toward the light guide 42. The light guide 42 may be constructed from clear acrylic or polycarbonate (PMMA) material. Further, the light guide 42 may include a surface treatment such as a texture or grain, molded geometrical facets or white ink or paint. Consequently, the light guide 42 may diffuse the light received from the light source 38, thereby providing a substantially uniform light distribution to the trim component 34. A light shield 44 positioned beneath the light guide 42 is configured to block light emitted by the light guide 42 toward the display 32. In certain embodiments, the light shield 44 may include a reflective surface configured to reflect the light from the light guide 42 toward the trim component 34 in a direction 54. In alternative embodiments, the light shield 44 may include a white or other light colored surface configured to further diffuse the light. Additionally, the light shield 44 may be constructed from a metallic material to dissipate heat generated by the light source 38. In certain embodiments, the circuit assembly 40 and the light shield 44 may be constructed as a single part.

The side-firing configuration of the light source 38 and the diffusive properties of the light guide 42 allow for a low profile design of the vehicle interior assembly. In particular, because the light source 38 is positioned radially outward from the light guide 42, the height of the assembly may be reduced compared to configurations in which the light source is disposed beneath the light guide 42. It should be appreciated that, in alternative embodiments, a low profile design may be achieved by disposing the light source 38 in other locations that are not in between the light guide 42 and the display 32. The low profile design enables the illuminated trim component to be placed directly above a display 32 without blocking an angled view of the display 32. As a result, the illustrated vehicle interior assembly provides the appearance that the display 32 and the interior trim component 34 are an integrated unit.

The vehicle interior assembly also includes a housing 36 disposed about the interior trim component 34. In certain embodiments, the interior trim component 34 may be constructed from a light transmissive material such as polymethyl methacrylate, for example. In other embodiments, the light transmissive material may be another type of acrylic, or a clear polypropylene or polycarbonate. In addition, the light transmissive interior trim component 34 may be surface treated to create a desired graphical display. For example, the show surface of the light transmissive interior trim component may be coated with a first layer 48 white paint. Subsequently, a second layer 50 of black paint may be applied on top of the first layer 48. Thereafter, laser etching may be used to remove a portion of the second layer 50 to reveal the first layer 48 in the shape of the desired graphic 46. As a result, the light emitted by the light guide 42 will pass through the interior trim component 34 and illuminate the graphic 46. While laser etching paint layers is described above, it should be appreciated that other processes may be employed to dispose the graphic 46 onto the show surface of the interior trim component 34. For example, the graphic 46 may be printed on an appliqué and then applied to the show surface of the interior trim component 34. Another process may include molding the graphic 46 into the interior trim component 34.

Figure 6:
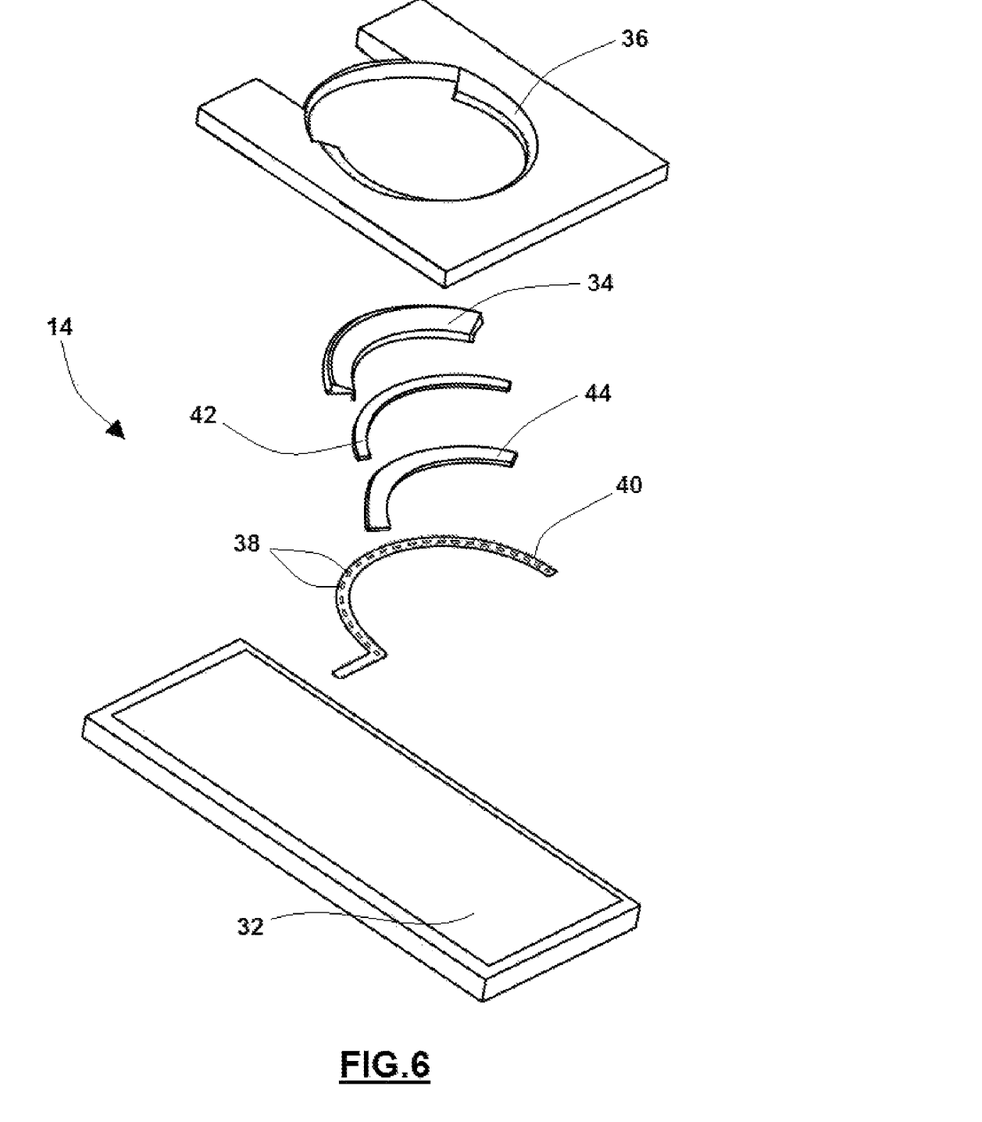
FIG. 6 is an exploded perspective view of the vehicle interior assembly of FIG. 4.

FIG. 6 is an exploded perspective view of the vehicle interior assembly of FIG. 4. In the illustrated embodiment, multiple light sources 38 are disposed on a circuit assembly 40. While the illustrated embodiment shows the light sources 38 and the circuit assembly 40 in a semi-circular configuration, alternative embodiments may have different numbers of light sources 38 in different configurations to accommodate various levels of backlighting. For example, a sufficient number of light sources 38 may be provided to enable the interior trim component to emit light at a substantially similar luminous intensity as the display 32. As shown, the vehicle interior assembly includes a light shield 44 configured to block light emitted by the light sources 38 toward the display 32. In addition, the vehicle interior assembly includes a light guide 42 configured to receive the light emitted by the light sources 38 and to direct the light toward an interior trim component 34. In addition, a housing 36 is configured to receive and enclose the interior trim component 34, the light guide 42, the light shield 44 and the circuit assembly 40. As mentioned above, it should be appreciated that the housing 36, the interior trim component 34, the light guide 42 and the light shield 44 may employ different configurations to accommodate various desired backlighting effects.

Figure 7:
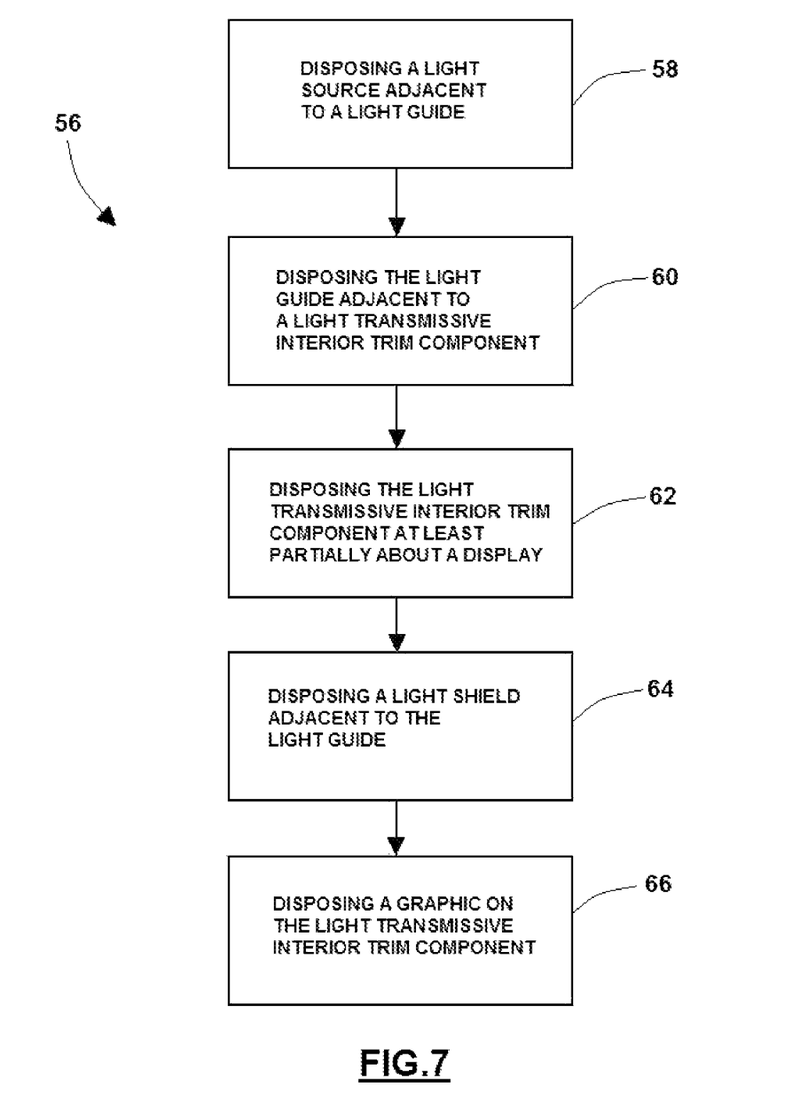
FIG. 7 is a flow diagram of an exemplary method for manufacturing a vehicle interior assembly configured to provide backlit graphics using a low profile configuration.

FIG. 7 is a flow diagram of an exemplary method 56 for illuminating a vehicle interior trim component. First, as represented by block 58, a light source 38 is disposed adjacent to a light guide 42. For example, the light source 38 may be positioned radially outward from the light guide 42. Next, the light guide 42 is disposed adjacent to a light transmissive interior trim component 30, as represented by block 60. Thereafter, as represented by block 62, the light transmissive interior trim component 30 is disposed at least partially about a display, such as an electromechanical gauge 28 or a graphical display 32. For example, the interior trim component 34 may be placed directly adjacent to a show surface of the display 32, thereby providing an integrated appearance. Further, a light shield 44 may be disposed adjacent to the light guide 42, as represented by block 64. In certain embodiments, the light shield 44 is configured to block light emitted by the light guide 42 toward the display 32. Finally, as represented by block 66, a graphic 46 may be disposed on the light transmissive interior trim component 34 by a process such as painting and laser etching, molding or using a printed appliqué. As a result, light emitted from the light source will illuminate the light guide, thereby illuminating the graphic 46 on the show surface of the light transmissive interior trim component 34.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A vehicle interior assembly, comprising:
   a light guide;
   a light source configured to illuminate the light guide; and
   an interior trim component positioned adjacent to an electronic graphical display, wherein the interior trim component comprises a light transmissive material configured to receive light from the light guide, and to emit light into a vehicle interior;
   wherein the light source is positioned between the electronic graphical display and the interior trim component and is not positioned between the light guide and the electronic graphical display.
2. The vehicle interior assembly of claim 1, wherein the light source comprises a light emitting diode.

3. The vehicle interior assembly of claim 1, comprising a graphic disposed on a show surface of the interior trim component.

4. The vehicle interior assembly of claim 1, wherein the electronic graphical display comprises a liquid crystal display.

5. The vehicle interior assembly of claim 1, comprising a printed circuit board positioned adjacent to the light guide, and configured to drive the light source.

6. The vehicle interior assembly of claim 1, comprising a flex circuit positioned adjacent to the light guide, and configured to drive the light source.

7. The vehicle interior assembly of claim 1, comprising a housing disposed about a perimeter of the interior trim component.

8. The vehicle interior assembly of claim 1, wherein the interior trim component comprises polymethyl methacrylate.

9. The vehicle interior assembly of claim 1, comprising a light shield positioned adjacent to the light guide, opposite from the interior trim component.

10. The vehicle interior assembly of claim 9, wherein the light shield is configured to dissipate heat generated by the light source.

11. A vehicle interior assembly, comprising:
    an electronic graphical display;
    a light transmissive interior trim component having a first side and a second side, wherein the first side faces the electronic graphical display;
    a light guide disposed adjacent to the first side; and
    a light source configured to illuminate the light guide, wherein the light source is positioned between the electronic graphical display and the light transmissive interior trim component and is not positioned between the light guide and the electronic graphical display;
    wherein the light transmissive interior trim component is configured to receive light from the light guide and to emit light from the second side.

12. The vehicle interior assembly of claim 11, wherein the electronic graphical display comprises a digital display.

13. The vehicle interior assembly of claim 11, comprising a graphic disposed on the second side of the light transmissive interior trim component.

14. The vehicle interior assembly of claim 11, comprising a light shield positioned adjacent to the light guide, opposite from the light transmissive interior trim component.

15. A method for manufaturing a vehicle interior assembly, comprising:
    disposing a light source adjacent to a light guide such that light emitted from the light source is directed toward the light guide;
    disposing the light guide adjacent to a light transmissive interior trim component such that light emitted from the light guide is directed toward the light transmissive interior trim component; and
    disposing the light trasmissive interior trim component at least partially adjacent to an electronic graphical display, wherein the light source is positioned between the electronic graphical display and the light transmissive interior trim component and is not positioned between the light guide and the electronic graphical display.

16. The method of claim 15, comprising disposing a light shield adjacent to the light guide, opposite from the light transmissive interior trim component.

17. The method of claim 15, comprising disposing a graphic on the light transmissive interior trim component such that the light emitted from the light guide illuminates the graphic.

18. The method of claim 17, wherein disposing a graphic on the light transmissive interior trim component comprises disposing a first layer onto a surface of the light transmissive interior trim component, disposing a second layer onto the first layer, and laser etching the second layer to expose the first layer.

19. The method of claim 15, comprising mounting the light source to a printed circuit board, and positioning the printed circuit board adjacent to the light guide.

20. The method of claim 15, comprising mounting the light source to a flex circuit, and positioning the flex circuit adjacent to the light guide.

* * * * *